(12) United States Patent
Le Brusq et al.

(10) Patent No.: US 12,049,117 B2
(45) Date of Patent: Jul. 30, 2024

(54) METHOD FOR VENTING A PNEUMATIC SYSTEM OF A VEHICLE, PNEUMATIC SYSTEM AND VEHICLE

(71) Applicant: VOLVO TRUCK CORPORATION, Gothenburg (SE)

(72) Inventors: Philippe Le Brusq, Communay (FR); Michael Millet, Moidieu-Détourbe (FR); Pierig Gaillaud, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 567 days.

(21) Appl. No.: 17/277,560

(22) PCT Filed: Oct. 11, 2018

(86) PCT No.: PCT/EP2018/077760
§ 371 (c)(1),
(2) Date: Mar. 18, 2021

(87) PCT Pub. No.: WO2020/074083
PCT Pub. Date: Apr. 16, 2020

(65) Prior Publication Data
US 2021/0355969 A1 Nov. 18, 2021

(51) Int. Cl.
*B60G 17/04* (2006.01)
*B60T 17/00* (2006.01)
(Continued)

(52) U.S. Cl.
CPC ........ *B60G 17/0408* (2013.01); *B60T 17/008* (2013.01); *B60T 17/02* (2013.01);
(Continued)

(58) Field of Classification Search
CPC . B60T 17/02; B60G 17/0408; B60G 2400/50; B60G 2400/51222;
(Continued)

(56) References Cited

U.S. PATENT DOCUMENTS 7,363,127 B2 * 4/2008 Fogelstrom ............. B60T 17/02
60/611
9,688,260 B2 * 6/2017 Aixala ..................... B60T 17/02
(Continued)

FOREIGN PATENT DOCUMENTS

DE 102012223158 A1 6/2014
WO 2012079680 A1 6/2012

OTHER PUBLICATIONS

International Search Report and Written Opinion dated Jun. 25, 2019 in corresponding International PCT Application No. PCT/EP2018/077760, 12 pages.

*Primary Examiner* — Kevin F Murphy
(74) *Attorney, Agent, or Firm* — Venable LLP; Jeffri A. Kaminski

(57) ABSTRACT

Method for venting a pneumatic system of a vehicle, pneumatic system and vehicle Method for venting a pneumatic system (1) of a vehicle, the pneumatic system (1) comprising an air compressor (4), a pneumatic circuit (2), an air pressure management system (6) in communication with the air compressor (4) and the pneumatic circuit (2), and a control unit, the method comprising: —while pressure in the pneumatic circuit (1) is less than a cut-out pressure, supplying the pneumatic circuit (2) with compressed air from the air compressor (4) operated at an operating speed through the air pressure management system (6), —once pressure in the pneumatic circuit (2) reaches the cut-out pressure, lowering pressure in the pneumatic circuit (2) to a target pressure, the air compressor (4) being operated at at least one deflating speed lower than the operating speed, the deflating speed being non null, —after pressure in the pneumatic circuit (2) has reached the cut-out pressure, releasing compressed air in the air pressure management system (6) to the outside environment.

13 Claims, 3 Drawing Sheets

Figure 1:
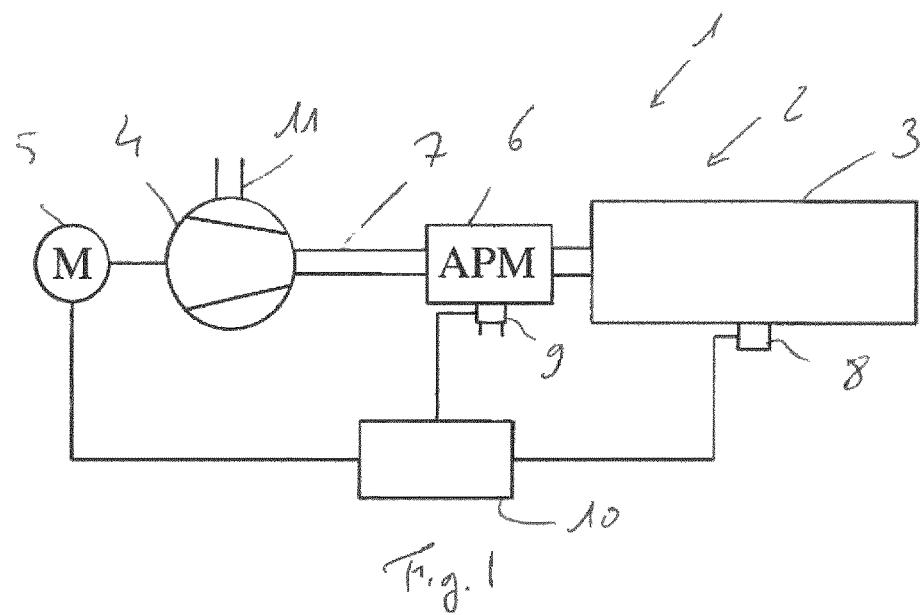

(51) Int. Cl.
    *B60T 17/02*       (2006.01)
    *F15B 13/02*       (2006.01)

(52) U.S. Cl.
    CPC .... *B60G 2300/026* (2013.01); *B60G 2300/14* (2013.01); *B60G 2400/50* (2013.01); *B60G 2500/02* (2013.01); *B60G 2500/2012* (2013.01); *B60G 2500/2044* (2013.01); *B60G 2500/205* (2013.01); *B60G 2600/44* (2013.01); *F15B 13/024* (2013.01); *F15B 2211/565* (2013.01)

(58) Field of Classification Search
    CPC .... B60G 2500/2012; B60G 2500/2044; B60G 2500/205
    See application file for complete search history.

(56) References Cited

U.S. PATENT DOCUMENTS

| | | |
|---|---|---|
| 10,717,336 B2 * | 7/2020 | Frank .................... B60T 17/004 |
| 2002/0153688 A1 | 10/2002 | Jurr et al. |
| 2013/0318954 A1 | 12/2013 | Frank et al. |
| 2016/0001624 A1 | 1/2016 | Meissner et al. |

* cited by examiner

METHOD FOR VENTING A PNEUMATIC SYSTEM OF A VEHICLE, PNEUMATIC SYSTEM AND VEHICLE

CROSS-REFERENCE TO RELATED APPLICATIONS

This application is a U.S. National Stage application of PCT/EP2018/077760, filed Oct. 11, 2018, and published on Apr. 16, 2020, as WO 2020/074083 A1, all of which is hereby incorporated by reference in its entirety.

The invention relates to a method for venting a pneumatic system of a vehicle, to a pneumatic system and to a vehicle.

Although not limited thereto, the invention applies to the pneumatic system of a large vehicle such as a truck or a bus.

The pneumatic system comprises a pneumatic circuit including at least one equipment, such as a pneumatic braking system, a pneumatic suspension system or other, operating with compressed air supplied from an air compressor. The pneumatic system also comprises an air pressure management system in communication with the air compressor and the pneumatic circuit to conduct and distribute compressed air. A control unit is provided for controlling the air compressor and the air pressure management system.

In such pneumatic system, after the pneumatic circuit has been inflated, namely the equipments have been supplied with compressed air and a cut-out pressure is reached, the pneumatic circuit is isolated from the remaining of the pneumatic system by the air pressure management system to keep it pressurized, and a discharge line connecting the air compressor and the air pressure management system is vented. Venting of the discharge consists in releasing compressed air to an outside environment surrounding the vehicle. To that end, the air pressure management system comprises an exhaust port opening in the outside environment.

Release of compressed air at the cut-out pressure, possibly above 10 bars, causes noise and acoustic nuisance for a driver of the vehicle as well as people in proximity of the vehicle. Such acoustic nuisance is of greater importance when the vehicle is electric, since the noise is not covered by other noises from the vehicle and a difference in acoustic levels upon release of compressed air is very high.

Solutions implementing restrictors or silencers to reduce noise upon release of compressed air exist and are disclosed for example in documents US 2002/0153688, US 2013/0318954 and WO 2012/079680.

However, known solutions have not proven to be that efficient as regards to noise reduction and further require complex modifications of the air pressure management system.

The invention aims at solving the above mentioned problems.

To this end, according to a first aspect, the invention proposes a method for venting a pneumatic system of a vehicle, the pneumatic system comprising:
- an air compressor having a variable speed in a range of speeds,
- a pneumatic circuit including at least one equipment operating with compressed air,
- an air pressure management system comprising:
- at least one conduit connected to the pneumatic circuit through a valve, the valve having an open state allowing compressed air to pass through said valve and a closed state preventing compressed air from passing through said valve,
- an exhaust port opening to an outside environment, the exhaust port having an open state allowing compressed air to pass through said exhaust port and a closed state preventing compressed air from passing through said exhaust port,
- a discharge line directly (i.e. without non-return valve) connecting the air compressor and the air pressure management system,
- a control unit for controlling the air compressor and the air pressure management system, wherein the method comprises:
- while pressure in the pneumatic circuit is between a cut-in pressure and a cut-out pressure, supplying the pneumatic circuit with compressed air from the air compressor through the discharge line and the air pressure management system, the valve being in the open state, the exhaust port being in the closed state and the air compressor operating at an operating speed of the range of speeds,
- once pressure in the pneumatic circuit reaches the cut-out pressure, lowering pressure in the discharge line, the valve being in the closed state, the exhaust port being in the closed state and the air compressor operating at at least one reduced speed of the range of speeds lower than the operating speed, the reduced speed being non zero,
- after pressure in the discharged line has lowered, releasing compressed air in the discharge line to the outside environment, the valve being in the closed state, the exhaust port being in the open state and the air compressor being stopped.

The invention takes advantage that the air compressor is not airtight so that in the absence of non-return valve in the discharge line between the air compressor and the air pressure management system, a leakage of compressed air occurs through the air compressor after the pneumatic circuit has been isolated from the remaining of the pneumatic system by the air pressure management system. Thanks to these provisions, upon opening of the exhaust port, compressed air in the discharge line is released at a reduced pressure, thereby reducing an acoustic level of the noise generated.

Hence, pressure in the discharge line may be lowered before compressed air is released to the outside environment through the exhaust port without requiring any modification of the air pressure management system. The acoustic level during venting is then reduced in a simple and efficient manner.

The reduced speed may be equal to or less than 50% of the operating speed, preferably equal to or less than 35% of the operating speed, more preferably equal to or less than 20% of the operating speed.

Pressure in the discharge line may be lowered for a time period before compressed air in the discharge line is released to the outside environment.

Alternatively, once pressure in the pneumatic circuit reaches the cut-out pressure, pressure in the discharge line may be lowered to a target pressure, and after pressure in the discharge line has reached the target pressure, compressed air in the discharge line may be released to the outside environment.

The method may further comprise, before releasing compressed air in the discharge line to the outside environment and after operating the air compressor at the reduced speed, stopping the air compressor.

The method may further comprise, before releasing compressed air in the discharge line to the outside environment and after having stopped the air compressor, rotating the air compressor in reverse.

According to a second aspect, the invention proposes a pneumatic system for a vehicle comprising:
- an air compressor having a variable speed in a range of speeds,
- a pneumatic circuit including at least one equipment operating with compressed air,
- an air pressure management system comprising:
  - at least one conduit connected to the pneumatic circuit through a valve, the valve having an open state allowing compressed air to pass through said valve and a closed state preventing compressed air from passing through said valve,
  - an exhaust port opening to an outside environment, the exhaust port having an open state allowing compressed air to pass through said exhaust port and a closed state preventing compressed air from passing through said exhaust port,
- a discharge line directly connecting the air compressor and the air pressure management system,
- a control unit for controlling the air compressor and the air pressure management system,
- wherein the control unit is configured to implement the method as defined previously.

According to a third aspect, the invention proposes a vehicle comprising a pneumatic system as defined previously.

Figure 2:
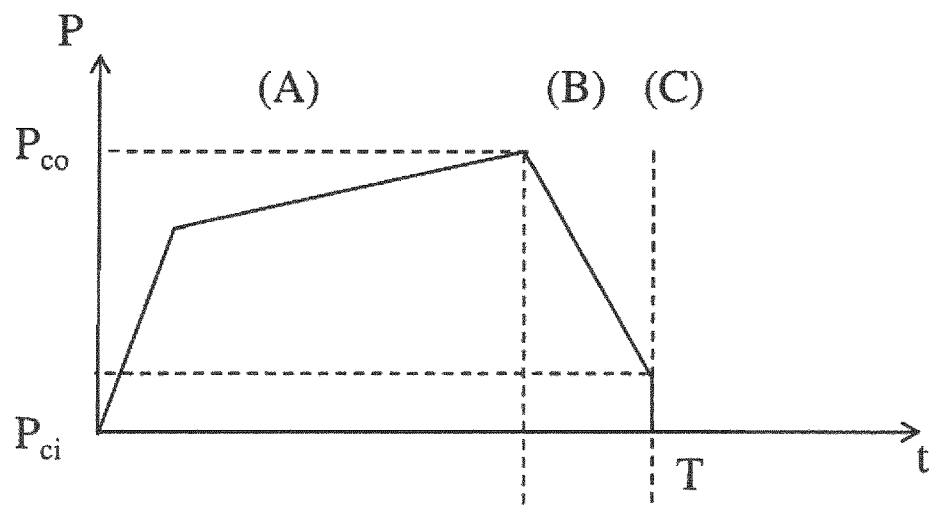
Figure 2:
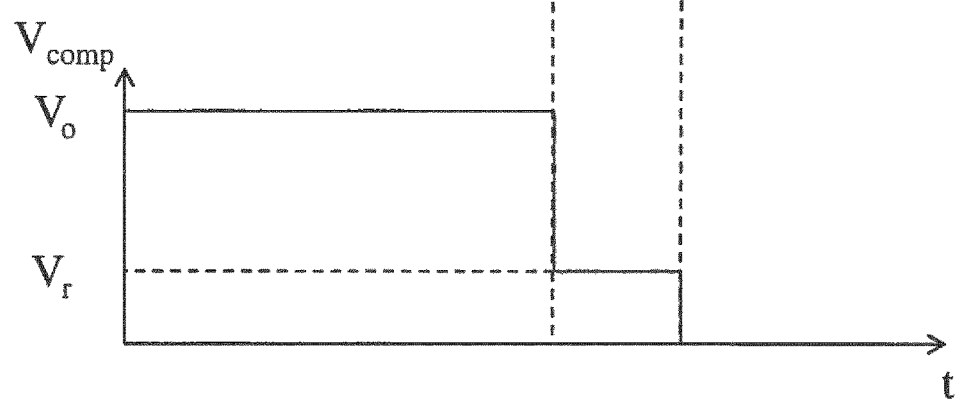
Figure 3:
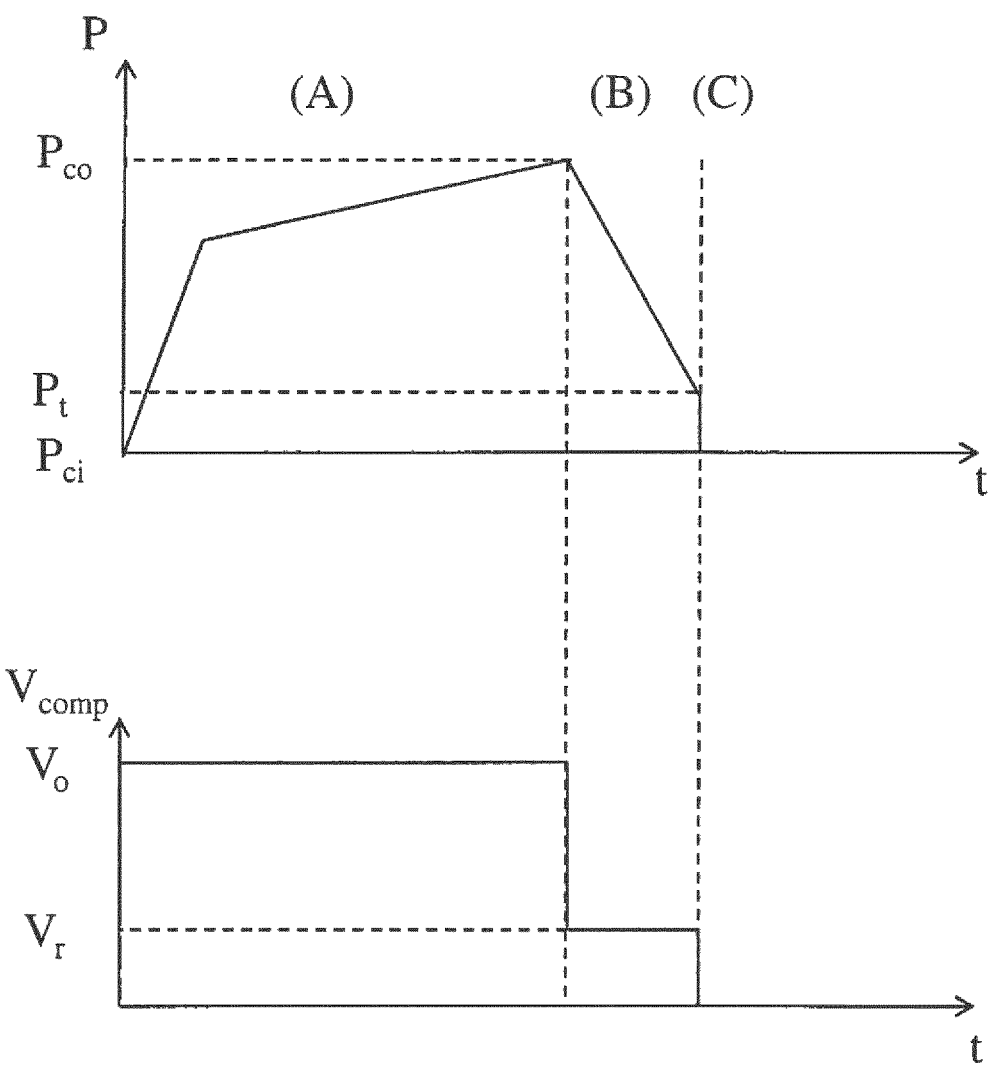
Figure 4:
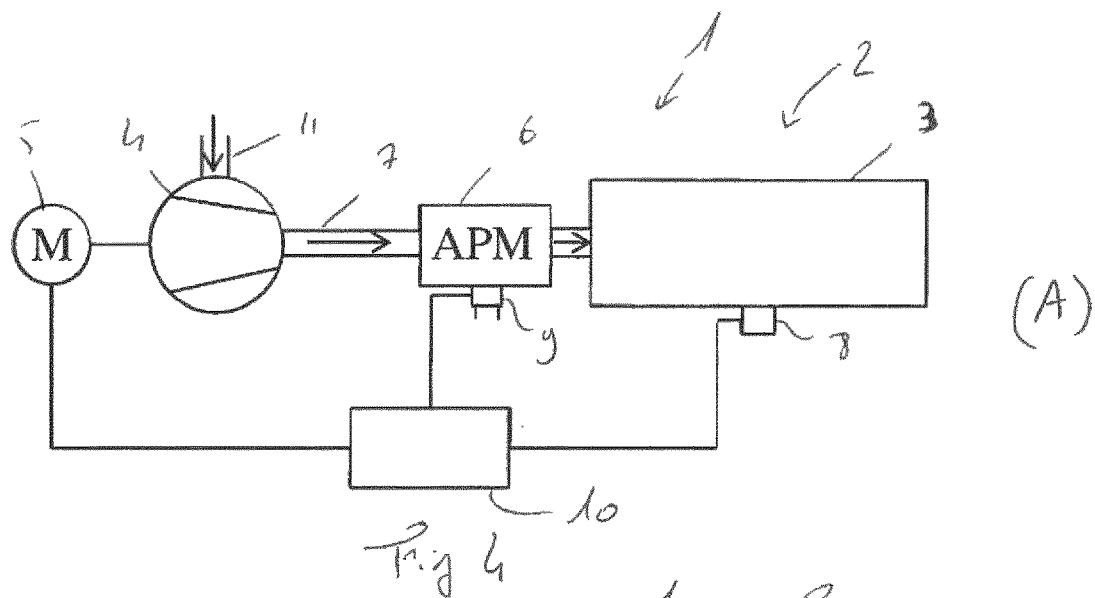
Figure 5:
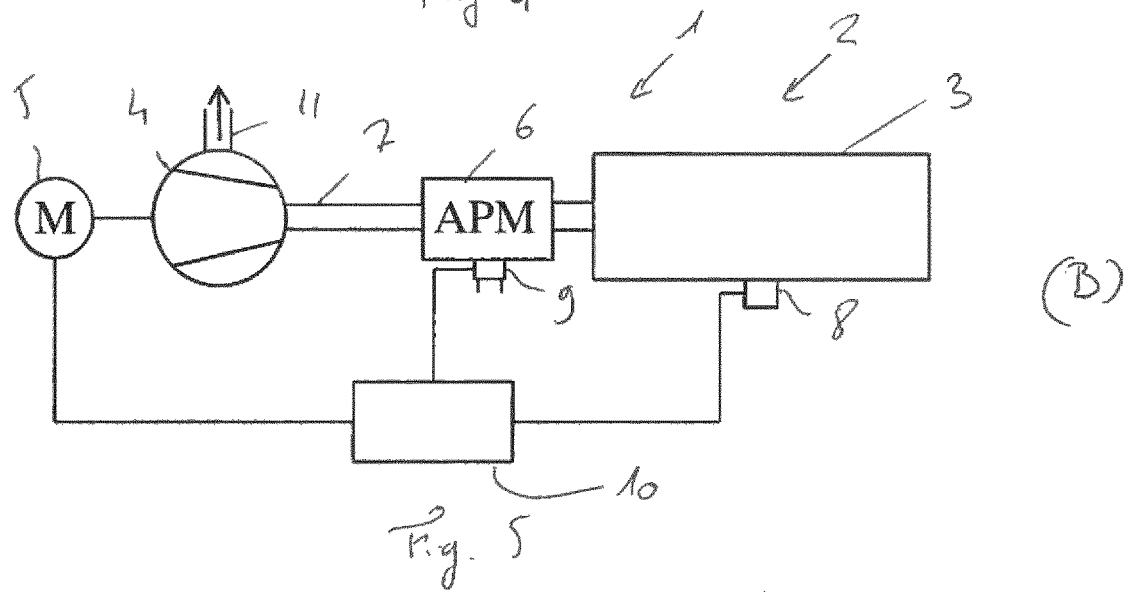
Figure 6:
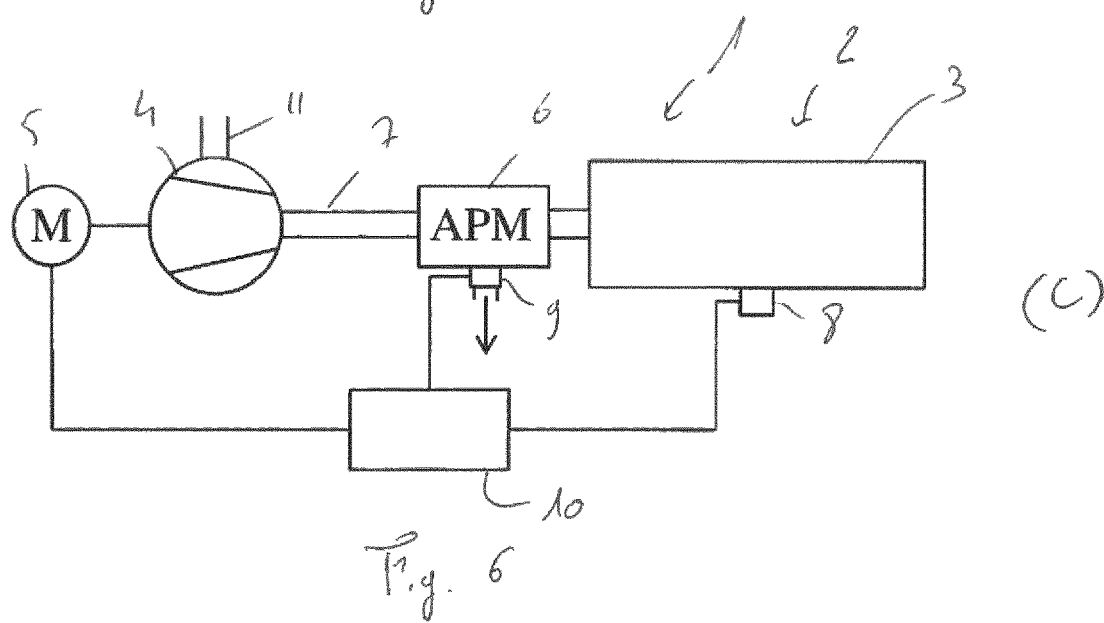

Other objects and advantages of the invention will emerge from the following disclosure of a particular embodiment of the invention given as non limitative example, the disclosure being made in reference to the enclosed drawings in which:

FIG. 1 is a schematic representation of a pneumatic system according to an embodiment of the invention, the pneumatic system comprising an air compressor, a pneumatic circuit including at least one equipment operating with compressed air, an air pressure management (APM) system in communication with the air compressor and the pneumatic circuit, and a control unit for controlling the air compressor and the air pressure management system, FIG. 2 is a diagram illustrating a variation of speed of the air compressor of the pneumatic system of FIG. 1 as a function of time and a corresponding variation of pressure in a discharge line connecting directly the air pressure management system to the air compressor as a function of time, illustrating a release of compressed air in the discharge line after a time period has elapsed, FIG. 3 is a diagram similar to that of FIG. 2, illustrating a release of compressed air in the discharge line after a target pressure has been reached, FIG. 4 is a schematic representation of the pneumatic system of FIG. 1 in an inflating phase during which compressed air is supplied from the air compressor operating at an operating speed to the pneumatic circuit through the air pressure management system, FIG. 5 is a schematic representation of the pneumatic system of FIG. 1 in a deflating phase during which compressed air in the discharge line is released by a leakage through the air compressor while the pneumatic circuit is isolated from the remaining of the pneumatic system by the air pressure management system and the air compressor is operating at a reduced speed lower than the operating speed, FIG. 6 is a schematic representation of the pneumatic system of FIG. 1 in a venting phase during which compressed air in the discharge line is released to the outside environment through an exhaust port of the air pressure management system.

In the figures, the same reference numbers refer to the same or similar elements.

FIG. 1 represents a pneumatic system 1 of a vehicle according to an embodiment of the invention. The vehicle, especially a large vehicle such as a truck or a bus, may be an electric vehicle, i.e. with an engine powered by electrical energy.

The pneumatic system 1 comprises a pneumatic circuit 2 including one or several equipments 3, such as a pneumatic braking system, a pneumatic suspension system or other, operating with compressed air.

Compressed air is supplied by an air compressor 4 having a variable speed $V_{com}$ in a range of speeds. In particular, the air compressor 4 may be driven by an electric motor 5 and powered by an electric power source, possibly combined with a battery assembly of the vehicle, driving the air compressor 4. The air compressor 4 is deprived of any non-return valve and is non-airtight.

The pneumatic system 1 comprises an air pressure management (APM) system 6 in communication with the air compressor 4 and the pneumatic circuit 2.

The APM system 6 comprises one or several valves of any appropriate kind so as to present an open state allowing compressed air to pass through it and a closed state preventing compressed air from passing through it. The valves may be pressure overflow valves. The APM system 6 may also comprise an air dryer, an oil separator and one or several pressure sensors.

The APM system 6 is further provided with an exhaust port 9 opening to an outside environment surrounding the vehicle. The exhaust port 9 is configured to present an open state allowing compressed air to pass through it and a closed state preventing compressed air from passing through it.

The pneumatic system 1 comprises a discharge line 7 connecting directly, namely without non-return valve, the air compressor 4 and the APM system 6.

The air compressor 4 and the APM system 6 are controlled by a control unit 10, the control unit 10 including a single control unit controlling both the air compressor 4 and the APM system 6 or several elementary control units controlling the air compressor 4 and the APM system 6 respectively. The control unit 10 further include one or several air pressure sensors 8 for sensing pressure within the pneumatic circuit 2 and possibly pressure of the compressed air from the air compressor 4.

In relation with FIGS. 2 to 6, operation of the pneumatic system 1 is disclosed.

As shown in FIGS. 2, 3 and 4, when pressure in the pneumatic circuit 2 is insufficient, namely between a cut-in pressure $P_{ci}$, for example of 9 bar, and a cut-out pressure $P_{co}$, for example of 10.5 bar, the pneumatic system 1 operates in an inflating phase A. During the inflating phase A, air, the flow of which is represented by arrows in FIG. 4, is drawn through an intake port 11, possibly equipped with an air filter, of the air compressor 4 and compressed by the air compressor 4 to be supplied to the pneumatic circuit 2 through the APM system 6. To that end, the valves are in the open state and the air compressor 4 is operating at an operating speed $V_O$, possibly the design speed, of the range of speeds, while the exhaust port 9 is in the closed state.

As shown in FIGS. 2, 3 and 5, once pressure P in the pneumatic circuit 2 reaches the cut-out pressure $P_{co}$, the control unit 10 sends command signals to have the valves set in the closed state and the air compressor 4 operated at a non-zero reduced speed $V_r$ of the range of speeds lower than the operating speed $V_0$, the exhaust port 9 remaining in the closed state. The pneumatic system 1 is then in a deflating phase B in which pressure in the discharge line 7 is lowered. Indeed, in such deflating phase B, the pneumatic circuit 2 is isolated from the remaining of the pneumatic system by the APM system 6. Since the air compressor 4 is not completely airtight and no non-return valve is provided in the discharge line 7 or in the air compressor 4, compressed air in the APM system 6 may leak through the intake port 11 previously used to draw air of the air compressor 4.

In particular, the reduced speed $V_r$ may be equal to or less than 50% of the operating speed $V_0$, preferably equal to or less than 35% of the operating speed $V_0$, more preferably equal to or less than 20% of the operating speed $V_0$.

In some embodiments, several decreasing reduced speeds $V_r$ may be implemented. Alternatively or in addition, after the air compressor 4 has operated at one or several reduced speeds $V_r$, the air compressor 4 may be stopped. Besides, after the air compressor 4 has been stopped, the air compressor 4 may operate in reverse. These provisions enable not only a decrease in pressure in the discharge line 7 to be accelerated but also an uncontrolled backward rotation caused by back pressure to be avoided.

As a purely illustrative example, as the operating speed $V_0$ of the air compressor 4 during the inflating phase A is 2000 rpm, for 1 min to 6 min, when cut-out pressure $P_t$ is reached, the air compressor 4 during the deflating phase B may be controlled as follow:

first reduced speed $V_r$: 400 rpm for 3 sec,
second reduced speed $V_r$: 200 rpm for 6 sec,
stop for 3 sec,
−200 rpm (or 200 rpm in reverse) for 2 sec, and
−500 rpm (or 200 rpm in reverse) for 7 sec.

As shown in FIGS. 2 and 6, after a time period T has elapsed, the pneumatic system 1 is placed in a venting phase C during which compressed air in the discharge line 7 is released to the outside environment through the exhaust port 9 in the open state, the valves remaining in the closed state and the air compressor 4 being stopped.

Alternatively, as shown in FIG. 3, setting the pneumatic system 1 in the venting phase C and the opening exhaust port 9 in the open state may be triggered upon reaching a target pressure $P_t$ in the discharge line 7.

The inflation A, deflation B and venting C phases are repeated during operation of the equipments of the pneumatic circuit 1 upon demand in compressed air.

The invention claimed is:

1. Method for venting a pneumatic system the pneumatic system comprising:
   an air compressor having a variable speed ($V_{ComP}$) in a range of speeds,
   a pneumatic circuit including at least one equipment operating with compressed air, an air pressure management system comprising:
   at least one conduit connected to the pneumatic circuit through a valve, the valve having an open state allowing compressed air to pass through said valve and a closed state preventing compressed air from passing through said valve,
   an exhaust port opening to an outside environment, the exhaust port having an open state allowing compressed air to pass through said exhaust port and a closed state preventing compressed air from passing through said exhaust port,
   a discharge line directly connecting the air compressor and the air pressure management system, a control unit for controlling the air compressor and the air pressure management system, wherein the method comprises:
   while pressure in the pneumatic circuit is between a cut-in pressure ($P_{ci}$) and a cut-out pressure ($P_{co}$), supplying the pneumatic circuit with compressed air from the air compressor through the discharge line and the air pressure management system, the valve being in the open state, the exhaust port being in the closed state and the air compressor (4) operating at an operating speed ($V_0$) of the range of speeds, —once pressure (P) in the pneumatic circuit reaches the cut-out pressure ($P_{co}$), lowering pressure in the discharge line, the valve being in the closed state, the exhaust port being in the closed state and the air compressor operating at at least one reduced speed ($V_r$) of the range of speeds lower than the operating speed ($V_0$), the reduced speed ($V_r$) being non zero, after pressure (P) in the discharge line has lowered, releasing compressed air in the discharge line to the outside environment, the valve being in the closed state, the exhaust port being in the open state and the air compressor being stopped.

2. Method according to claim 1, wherein the reduced speed ($V_r$) is equal to or less than 50% of the operating speed ($V_0$).

3. Method according to claim 1, wherein pressure in the discharge line is lowered for a time period (T) before compressed air in the discharge line is released to the outside environment.

4. Method according to claim 1, wherein once pressure (P) in the pneumatic circuit reaches the cut-out pressure ($P_{co}$), pressure in the discharge line is lowered to a target pressure ($P_t$), and after pressure (P) in the discharge line has reached the target pressure ($P_t$), compressed air in the discharge line is released to the outside environment.

5. Method according to claim 4, wherein the target pressure ($P_t$) is equal to or less than 50% of the cut-out pressure ($P_{co}$).

6. Method according to claim 4, wherein the target pressure ($P_t$) is equal to or less than 20% of the cut-out pressure ($P_{co}$).

7. Method according to claim 1, further comprising, before releasing compressed air in the discharge to the outside environment and after operating the air compressor at the reduced speed ($V_r$), stopping the air compressor.

8. Method according to claim 7, further comprising, before releasing compressed air in the discharge line to the outside environment and after having stopped the air compressor, rotating the air compressor in reverse.

9. Method according to claim 1, wherein the reduced speed ($V_r$) is equal to or less than 50% of the operating speed ($V_0$).

10. Method according to claim 1, wherein the reduced speed ($V_r$) is equal to or less than 35% of the operating speed ($V_0$).

11. Method according to claim 1, wherein the reduced speed ($V_r$) is equal to or less than 20% of the operating speed ($V_0$).

12. Pneumatic system for a vehicle comprising:
   an air compressor having a variable speed ($V_{ComP}$) in a range of speeds,
   a pneumatic circuit including at least one equipment operating with compressed air, an air pressure management system comprising:
   at least one conduit connected to the pneumatic circuit through a valve, the valve having an open state allowing compressed air to pass through said valve and a closed state preventing compressed air from passing through said valve, an exhaust port opening to an outside environment, the exhaust port having an open state allowing compressed air to pass through said exhaust port and a closed state preventing compressed air from passing through said exhaust port, a discharge line directly connecting the air compressor and the air pressure management system, a control unit for controlling the air compressor and the air pressure management system, wherein the control unit is configured to:

while pressure in the pneumatic circuit is between a cut-in pressure ($P_{ci}$) and a cut-out pressure ($P_{co}$), supply the pneumatic circuit with compressed air from the air compressor through the discharge line and the air pressure management system, the valve being in the open state, the exhaust port being in the closed state and the air compressor (4) operating at an operating speed ($V_0$) of the range of speeds, —once pressure (P) in the pneumatic circuit reaches the cut-out pressure ($P_{co}$), lower pressure in the discharge line, the valve being in the closed state, the exhaust port being in the closed state and the air compressor operating at at least one reduced speed ($V_r$) of the range of speeds lower than the operating speed ($V_0$), the reduced speed ($V_r$) being non zero, after pressure (P) in the discharge line has lowered, release compressed air in the discharge line to the outside environment, the valve being in the closed state, the exhaust port being in the open state and the air compressor being stopped.

13. Vehicle comprising a pneumatic system comprising an air compressor having a variable speed ($V_{ComP}$) in a range of speeds, a pneumatic circuit including at least one equipment operating with compressed air, an air pressure management system comprising:

at least one conduit connected to the pneumatic circuit through a valve, the valve having an open state allowing compressed air to pass through said valve and a closed state preventing compressed air from passing through said valve, an exhaust port opening to an outside environment, the exhaust port having an open state allowing compressed air to pass through said exhaust port and a closed state preventing compressed air from passing through said exhaust port, a discharge line directly connecting the air compressor and the air pressure management system, a control unit for controlling the air compressor and the air pressure management system, wherein the control unit is configured to:

while pressure in the pneumatic circuit is between a cut-in pressure ($P_{ci}$) and a cut-out pressure ($P_{co}$), supply the pneumatic circuit with compressed air from the air compressor through the discharge line and the air pressure management system, the valve being in the open state, the exhaust port being in the closed state and the air compressor (4) operating at an operating speed ($V_0$) of the range of speeds, —once pressure (P) in the pneumatic circuit reaches the cut-out pressure ($P_{co}$), lower pressure in the discharge line, the valve being in the closed state, the exhaust port being in the closed state and the air compressor operating at at least one reduced speed ($V_r$) of the range of speeds lower than the operating speed ($V_0$), the reduced speed ($V_r$) being non zero, after pressure (P) in the discharge line has lowered, release compressed air in the discharge line to the outside environment, the valve being in the closed state, the exhaust port being in the open state and the air compressor being stopped.

* * * * *